W. WESTON.
FLEXIBLE CHAIN WRENCH.
APPLICATION FILED SEPT. 9, 1920.
1,413,306.
Patented Apr. 18, 1922.
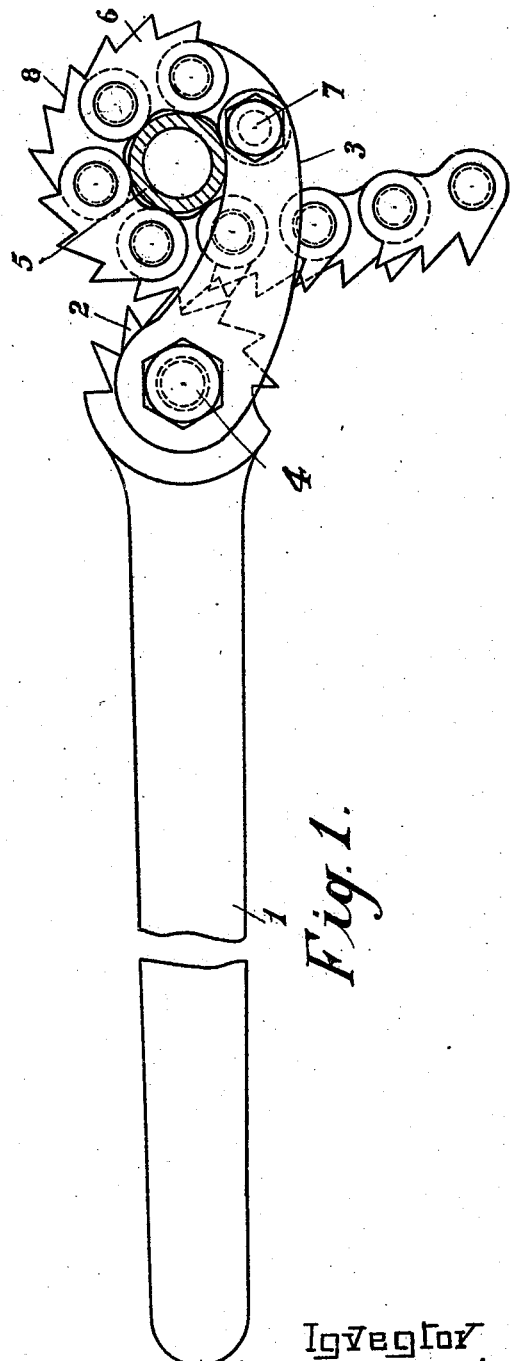
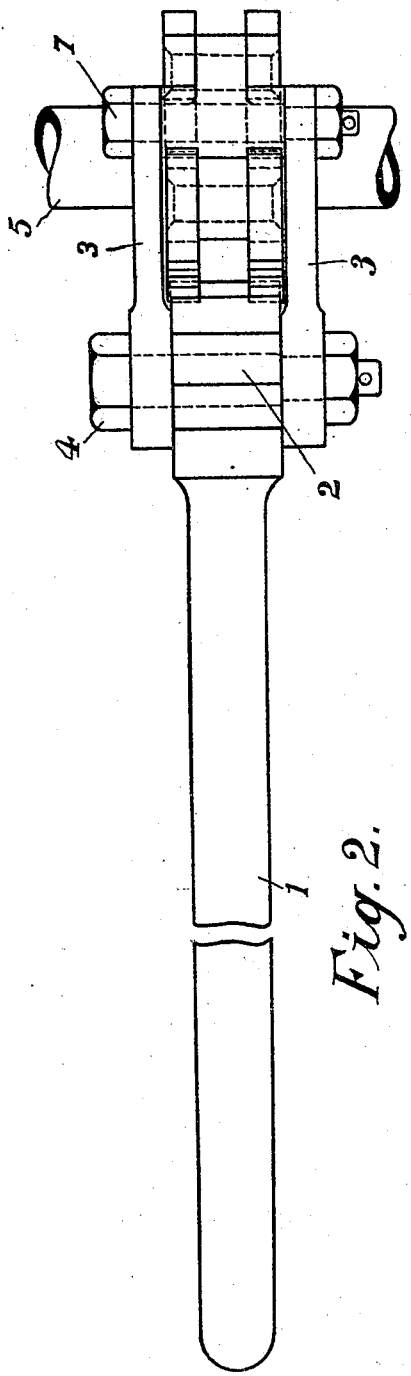
Inventor
William Weston:
By Dodge and Dodge
Associate Attorneys.

UNITED STATES PATENT OFFICE.

WILLIAM WESTON, OF LIVERPOOL, ENGLAND.

FLEXIBLE CHAIN WRENCH.

1,413,306.　　　　　Specification of Letters Patent.　　Patented Apr. 18, 1922.

Application filed September 9, 1920.　Serial No. 409,062.

*To all whom it may concern:*

Be it known that I, WILLIAM WESTON, subject of the King of Great Britain, residing in Liverpool, in the county of Lancaster and Kingdom of England, have invented certain new and useful Improvements in Flexible Chain Wrenches, of which the following is a specification.

This invention has reference to wrenches or spanners of the type in which a flexible gripping member is connected to the handle bar and is passed round the pipe, rod, nut or the like so as to grip it when the lever handle is turned.

My improved wrench comprises a handle bar, a flexible gripping member such as a chain coupled to the end of the handle bar by a pair of spaced parallel cheeks and adapted to be passed round the pipe and between the cheeks, and a tooth or teeth at the end of the handle adapted to engage corresponding teeth on the flexible gripping member, or apertures therein, so that the turning of the handle bar in one direction will tighten the chain round the pipe, rod, nut or the like sufficiently to grip it and so enable the pipe to be turned or be held against turning while the turning of the handle bar in the other direction will slacken the grip. In the preferred arrangement, the handle bar has integral with it a curved toothed segment at the end whose teeth are of the ratchet type. The flexible gripping chain is coupled to the outer end of the cheeks and the other end is passed round the pipe and through the space or passage between the toothed segment and the pipe, such chain being provided with teeth on its outer edge with which the toothed segment can engage. When the wrench is in operation the pipe or other object rests against the outer end portion of the cheeks. The invention will be understood from the following description reference being had to the accompanying drawings in which:—

Figure 1 is a side elevation of my improved wrench, and

Figure 2 is a plan view thereof.

The wrench shown in these figures comprises a handle bar 1, a toothed segment or arc 2 formed integral with the end of this handle bar, the teeth of which are of the ratchet type, and a pair of spaced cheeks or plates 3 pivotted on the pin 4 at the end of the said handle bar 1, the toothed segment 2 being concentric with the pin 4, and the cheeks 3 being located one at each side of the toothed segment 2. The cheeks 3 are preferably curved so that the end portion forms when the wrench is in use a seating for the pipe 5 or other object to be gripped thus causing the pipe to be spaced away from the toothed segment so as to leave a passage between them. The chain 6 is coupled at one end to the outer end of the cheeks 3 by the pin 7 and its other end is passed round the pipe 5 or other object and through the space between the toothed segment 2 and the pipe. The links of this chain 6 are provided with teeth 8 on their outer edges with which any of the teeth of the toothed segment 2 can engage both sets of teeth being of the ratchet type.

In operation, the chain 6 is passed round the pipe and through the space between it and the toothed segment 2. The teeth 8 on the chain are now brought up against the toothed segment 2, and the pipe caused to seat itself against the concave end portion of the cheeks 3. The handle bar is turned on its pivot 4 so that the toothed segment 2 tightens the chain 6 and the end portion of the cheeks 3 round the pipe and produces an effective gripping action, and so enables the pipe to be turned by the handle, or be held against turning. The turning of the handle on its pivot tends to pull the pipe or other object towards the toothed segment, thus keeping the toothed segment in engagement with the chain, so that there is no danger of the teeth slipping past one another accidentally. When the wrench is in use the cheeks 3 are angularly disposed to the plane which bisects the axis of the pivot 4 and the axis of the work 5. Various sizes of pipes or other objects can be gripped by the device; and longer cheeks 3 can be used when the pipe to be gripped is larger than that shown in the drawing.

Any of the teeth in the segment 2 can engage the teeth in the chain, and this enables the handle to be turned into the most convenient position for use, that is to say in the horizontal position shown or into an angular position.

Instead of providing a chain 6 with teeth 8 on its outer edge, a sprocket chain may be used, and the toothed segment 2 may be replaced by a sprocket segment, the relative distance of the links on the chain being equal in such case to the peripheral distance apart of the sprocket pins or teeth and the engagement of the sprockets with the chain prevents slipping.

I declare that what I claim is—

1. In a flexible chain wrench, the combination of a lever handle; a toothed segment formed at the outer end thereof; a pair of spaced cheek plates pivoted to the handle, the center about which the segment is struck and the pivotal point of the cheek plates being coincident; a chain pivotally connected at one end between the outer ends of the cheek plates; and a series of engaging members carried by the chain upon its outer face adapted to coact with the teeth upon the segment when held into contact therewith by an element to be operated upon and about which the chain is adapted to be passed.

2. In a flexible chain wrench, the combination of a lever handle; a ratchet toothed segment formed upon the outer end thereof; a pair of spaced cheek plates, said plates being curved to form at their outer ends a seat for the article to be gripped by the wrench; a bolt passing through the inner ends of said plates and the outer portion of the lever, said bolt and segment being concentric; a chain, one end of which is pivotally connected to the outer ends of the cheek plates; and a series of ratchet teeth formed on the outer face of the chain and adapted when the chain is wrapped about an article to engage the teeth of the segment.

In witness whereof, I have hereunto signed my name this 23 day of August 1920, in the presence of two subscribing witnesses.

WILLIAM WESTON.

Witnesses:
G. C. Dymond,
J. McLachlan.